Nov. 7, 1950     H. E. TOMPKINS     2,529,117
ELECTRICAL PHASE SHIFT SYSTEM Filed Aug. 30, 1945               6 Sheets-Sheet 1

INVENTOR.
HOWARD E. TOMPKINS
BY
Ostrolenk and Faber
ATTORNEYS

INVENTOR.
HOWARD E. TOMPKINS
BY
Ostrolenk and Faber

Nov. 7, 1950          H. E. TOMPKINS          2,529,117

ELECTRICAL PHASE SHIFT SYSTEM

Filed Aug. 30, 1945          6 Sheets—Sheet 5

INVENTOR.
HOWARD E. TOMPKINS
BY Ostrolenk and Faber

Patented Nov. 7, 1950

2,529,117

UNITED STATES PATENT OFFICE 2,529,117

ELECTRICAL PHASE SHIFT SYSTEM

Howard E. Tompkins, Media, Pa., assignor, by mesne assignments, to Philco Corporation, Philadelphia, Pa., a corporation of Pennsylvania Application August 30, 1945, Serial No. 613,457

7 Claims. (Cl. 178—44)

This invention relates to an electrical phase shifting system. More specifically, it relates to a network or system of networks for providing two signals which differ in phase from one another by a specified difference in phase-angle over a wide range of frequencies. In certain types of electronic equipment, such as equipment used for communication purposes or recording purposes and for measurement purposes, it at times becomes desirable to obtain two signals of the same frequency and amplitude and differing in phase-angle from one another by some constant prescribed or specified angle over a range of frequencies. For example, such a system is desired in the helical method of recording speech and other intelligence upon a round magnetic wire, as hereinafter described. Likewise, such a system is required in certain automatic power follower devices, such as those described in co-pending application Serial No. 603,027, filed July 13, 1945, now Patent No. 2,469,750, May 10, 1949.

Previous to my invention it has been possible to provide 90° of phase-shift between two signals at one frequency, but it has not been convenient to provide such a phase-shift over a wide percentage range of frequencies. My invention enables the production of an arbitrary phase-shift over a wide band of frequencies instead of at one frequency only. In order to accomplish this purpose, two channels are employed. One of these channels is designed in such a manner that it has a phase-shift curve with respect to frequencies which is continually increasing or continually decreasing in phase as the frequency increases. This first network, furthermore, has the characteristic that it does not have variations in the attenuation of the input signal as a function of frequency. That is, for a given input signal amplitude, the same output signal amplitude is obtained at all frequencies within the useful band.

The second channel has a similar characteristic in regard to phase, except that over a predetermined range of frequencies the phase-angle differs from the phase-angle of the first channel by the prescribed amount. Consequently, if a common signal is fed into the two channels, the output signals from the two channels will be of equal amplitude but will differ in phase by a prescribed phase-angle over the range of frequencies involved.

In such a system suitable phase-shifting networks for the two channels must be designed which over a range of frequencies differ in their phase-shift characteristics by a prescribed angle.

I have discovered that in order to design such a pair of networks, it is exceedingly helpful if a network is first designed which will have a linear phase characteristic when the phase-angle is plotted against the logarithm of the frequency. Another way of stating this characteristic is to say that the phase-angle is proportional to the logarithm of the frequency. For convenience this characteristic may be termed a "logarithmic phase characteristic." If a network is available with such a logarithmic phase characteristic, then it is always possible to design another network which has an exactly similar phase characteristic except that the phase characteristic of this new network is shifted in frequency—that is, the plot of the phase characteristic on the new, or second, network may be copied from the phase characteristic of the first network by translating the curve for the first network in the direction of the logarithmic frequency.

Once the first network is available, the design of the second network is accomplished by well known and simple network theory. Thus, to design the second network from the first network, the inductance of the first network is multiplied by a suitable constant and the capacitances are divided by the same suitable constant; the constant used being determined from the amount of shift along the logarithmic frequency axis that it is desired to obtain. From the above, it will be observed that according to my invention, the problem of providing two channels with a 90° or other specified phase-angle difference between the two channels is easily solved when the problem of the network with a logarithmic phase characteristic has been solved.

This latter problem I have solved with a lattice type structure. In one form of my lattice structure I use a pair of resistors for the series pair of arms and a pair of capacitors for the shunt pair of arms. In such a structure the phase-angle of the lattice can be shown to be proportional to the arc tangent of the ratio of the actual frequency to the frequency at which the value of the resistance is equal to the value of the reactance of the capacitor in the lattice. When the phase-angle of such a network is plotted against the logarithm of frequency, it can be shown that this curve contains a point of inflection.

It is well known that when several networks are properly connected in tandem, the phase-shift of the overall network can be obtained from the phase-shift of the individual networks by the simple process of adding the phase-angles of the individual networks. In order to obtain a logarithmic phase characteristic, I use several networks of the basic type which I have discussed above, choosing the frequency of the points of inflection to be different in the successive networks, so that when I add the phase-angles of all of the networks together, I obtain a resultant logarithmic phase characteristic over a considerable portion of the frequency spectrum. Of course, the more bridge or lattice sections which are used in tandem, the greater will be the region over which I obtain a logarithmic phase characteristic.

In joining together the individual lattice structures, it becomes necessary to make sure that the proper conditions are met at the junctions of the lattice structures. This I have accomplished in several ways. By the use of a differential-type amplifier, I can assure the proper matching of one lattice with the next. Likewise with two lattices I can insure proper matching by arranging the lattices so that one is a high-impedance lattice and the other is a low-impedance lattice. Details of these arrangements will be described later on in this specification.

As already stated, applications for my invention will be found in the helical method of recording signals upon round magnetic wire. In carrying out the helical method of recording, the audio signal is fed into both of the two channels of my invention. The signal which comes from the output of channel one is caused to record upon the magnetic wire on one transverse axis, and the signal which comes from channel two is caused to record upon the transverse axis of the magnetic wire which is at right angles to the first axis. The two channels are arranged to have a phase difference of substantially 90° over the audiofrequency range, or over that part of the frequency range which it is desired to record. Thus the recording is accomplished upon the wire in such a fashion that the magnetization of the wire progresses spirally along the wire, never going to zero in all of its directions while a signal is present.

When a signal has been recorded on a round magnetic wire by the helical method, as herein described, it may be reproduced from the wire by the use of a system involving a single transverse magnetic pickup device, regardless of the relative orientation of the wire and the pickup.

In reproducing signals recorded in the conventional non-helical transverse manner by the helical method, two pickup devices are arranged to pick up the applicable portions of the transversely recorded signals at right angles to each other from the magnetic wire. Signals from these two devices are passed through two separate channels. These channels are so designed that they have a difference in phase shift of 90° over the recorded signal frequency range. Thus the signals which come from the output of these two channels are substantially in time phase with one another, or are 180° out of phase with each other depending upon which direction is considered, and the amplitude of the resulting output is independent of the orientation of the wire. A selected output thus obtained is fed into the desired audio-amplifier system.

Thus, an object of my invention is to provide a network having a phase-shift characteristic curve which is linear with respect to the logarithm of frequency over a band of frequencies.

Another object of my invention is to provide a novel system for obtaining a prescribed phase shift between two signals over a wide frequency range.

Another object of my invention is to provide means for recording in a transverse direction on a round magnetic wire in accordance with the helical method of recording, thus providing a recording which may be reproduced by a single transverse pickup regardless of the orientation of the wire.

Another object is to provide novel electronic unit means for reproducing a magnetic signal transversely recorded on a wire by a device which is insensitive to the orientation of the wire.

Other objects and purposes of my invention will become apparent upon a study of the drawing in which.

Figures 1, 2, 4:
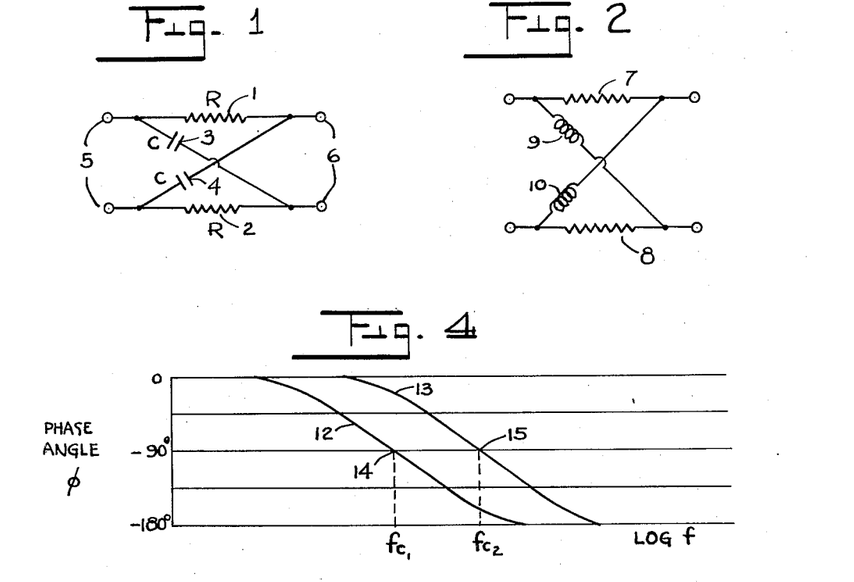
Figure 1 represents a basic lattice phase-shifting network.
Figure 2 represents another of the possible forms of phase-shifting network.
Figure 4 shows two such phase-shift curves, displaced from each other along the logarithmic frequency axis.

The basic lattice structure which I shall use in describing my invention is shown in Figure 1. This lattice is composed of two resistors, 1 and 2, and two capacitors, 3 and 4. There are a pair of input terminals 5, and a pair of output terminals 6. If a voltage $E_{in}$ is applied to the input terminal 5, the output voltage $E_{out}$ which appears at the output terminal 6 can be readily computed by circuit theory. When this calculation is carried out the following equation is obtained:

$$E_{out} = E_{in} \frac{1+(\omega CR)^2}{(1+j\omega CR)^2} \qquad (1)$$

This equation can readily be simplified by cancelling out the common factor in the numerator and denominator. This is Equation 2:

$$E_{out} = E_{in} \frac{1-j\omega CR}{1+j\omega CR} \qquad (2)$$

Since in this equation R and C appear only as a product combination, it becomes possible to replace the product of R and C by some other symbol. The product of R and C, according to electrical theory is the reciprocal of the angular frequency at which the phase-shift of the network is 90°. Thus it is possible to define $\omega_c$ as $$\omega_c = \frac{1}{RC} \qquad (3)$$

When Equation 3 is substituted in Equation 2, Equation 4 results:

$$E_{out} = E_{in} \frac{1-j\omega/\omega_c}{1+j\omega/\omega_c} \qquad (4)$$

Since this equation is given in terms of a ratio of angular frequencies, a simple substitution of $\omega = 2\pi f$ can be used to reduce this equation to an equation in terms of cyclical frequencies only. Such an equation is given in Equation 5.

$$E_{out} = E_{in} \frac{1-jf/f_c}{1+jf/f_c} \qquad (5)$$

By a simple transformation of complex-number theory, Equation 5 can be re-written in the form of Equation 6.

$$E_{out} = E_{in} \epsilon^{j2 \arctan f/f_c} \quad (6)$$

On first consideration Equation 6 appears to be more complicated than Equation 5, but nevertheless Equation 6 illustrates the fact that there is no change in amplitude between the input and the output signal—because the exponent of $\epsilon$ is imaginary. This imaginary exponent indicates a phase shift only has occurred with no change in amplitude between the input and output signals. Further inspection of Equation 6 makes it evident that the phase shift of the network can be written as in Equation 7, as the arc tangent of the "normalized" frequency, that is, the arc tangent of the frequency divided by the frequency at which there is 90° phase shift.

$$\phi = 2 \arctan f/f_c \quad (7)$$

Figure 3:
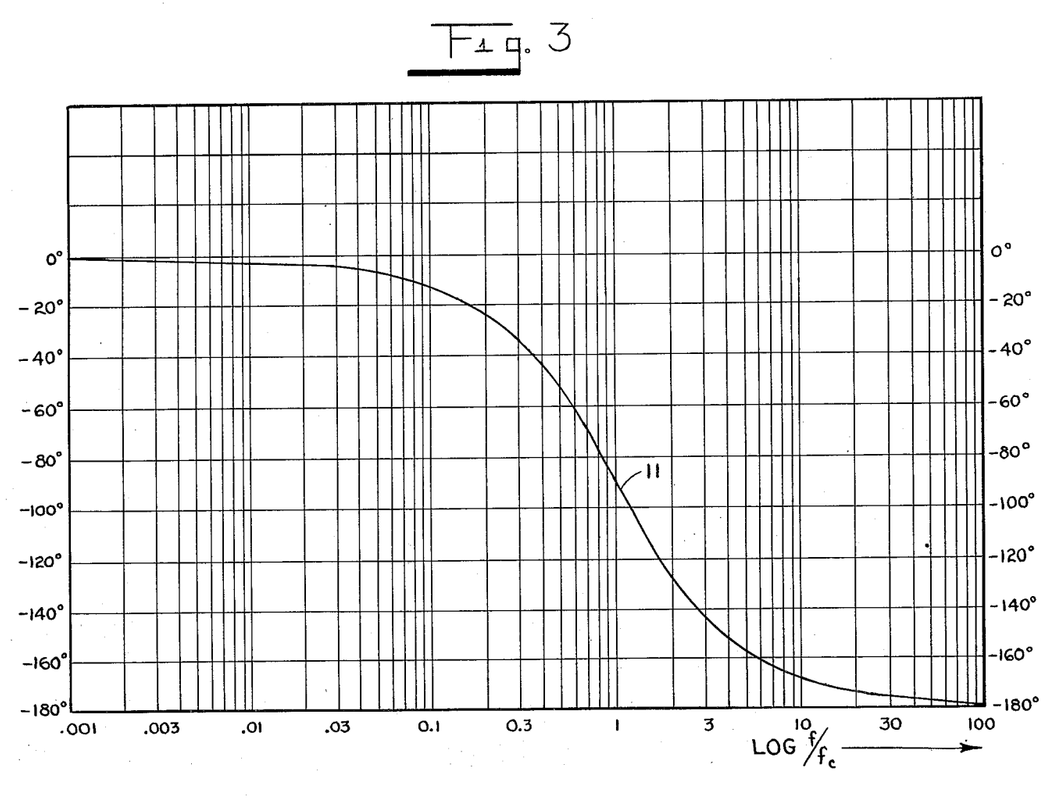
Figure 3 gives the phase-shift curve for the device of Figure 1 plotted against the logarithm of the frequency.

This phase-shift function is plotted in Figure 3, using a logarithmic scale for the ratio of the frequency to the critical frequency.

Other networks have similar phase-shift characteristics. For example, the network of Figure 2, which is comprised of two resistors 7 and 8, and two inductors 9 and 10, will have an identical phase shift characteristic, assuming resistanceless inductors.

There are likewise other networks which have phase-shift characteristics which are useful for the purposes to be described here. However, in view of the complexity which might be introduced by citing examples of many of these, I have limited myself in the description to follow to two networks built upon the network of Figure 1.

The curve of Figure 3 has the characteristics which are desirable for the purpose of my invention; that is, the phase curve is continually decreasing and over a certain region is substantially linear as a function of the logarithm of the frequency. It is to be noticed in this curve of Figure 3 that the point of inflection 11 of the curve occurs at the 90° point; that is, when the frequency is equal to the critical frequency. This point of inflection 11, then, comes in the middle of the substantially linear part of the curve.

The logarithmic plot of Figure 3 has the advantage that in transforming this curve to a curve where the actual frequency is plotted instead of the ratio of frequency to the inflection frequency, it is only necessary to locate the inflection frequency on the new scale of logarithm of frequency and then place the curve of Figure 3 on the new coordinate paper in such a manner that the inflection frequency on the new curve sheet is at the same place as the point 11 on the curve of Figure 3.

The curve of Figure 4 shows how a resultant curve might look after this has been done. Figure 4 shows two curves in which two inflection frequencies are used, $f_{c1}$ and $f_{c2}$. In obtaining the two phase-shift curves 12 and 13, a logarithmic frequency scale is laid out in the same manner and to the same scale as the logarithmic frequency ratio scale in Figure 3. Likewise, a phase-angle scale is laid out on the same scale used in Figure 3 for the phase-angle scale. Then the curve of Figure 3 is placed over the coordinate axes of Figure 4 and point 11 on Figure 3 is located so that it coincides with point 14 on Figure 4. Then curve 12 is drawn which is now the phase-shift curve for a network of the type of Figure 1 where the inflection frequency is given by the frequency $f_{c1}$.

In order to determine the shape and location of curve 13, this procedure is repeated placing the point of inflection 11 over the point 15 on curve 4. Then curve 13 is drawn as the curve corresponding to the curve of Figure 3.

Inspection of Figure 4 will show that for a region between 45° and 135°, there is substantially a constant phase shift between the two curves; thus for two networks of the character of Figure 1, and with the same voltage impressed on the two networks at the input terminals, the voltages at the output terminals from the two networks will have substantially a constant phase difference with respect to each other over a region of frequencies lying approximately between $f_{c1}$ and $f_{c2}$.

Furthermore it is to be observed that the greater the tolerance in the possible variation of phase angle with frequency, the wider the frequency band over which this network combination will give me the desired result.

For most purposes, however, the curves of Figure 4 do not give a sufficiently wide range of frequency over which the phase angle will be substantially constant. Consequently it becomes necessary to cascade two or more networks of the type of Figure 1.

Figure 5:
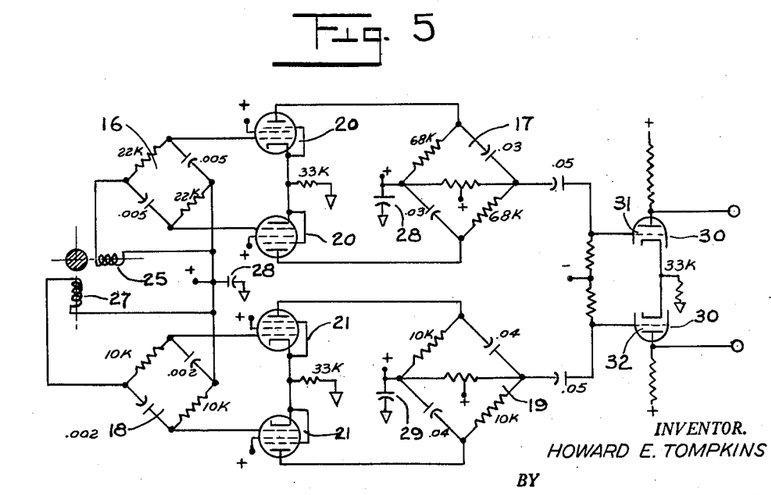
Figure 5 is one type of two-channel, two-lattice structure for carrying out my invention, the input signal of which is derived from a magnetic signal transversely recorded on a wire.

A system which employs two cascaded bridge networks is shown in Figure 5. In this figure, bridges 16 and 17 are cascaded with each other. They are coupled one to another with the aid of vacuum tubes 20. This combination forms one channel having a single phase-shift curve, as is shown by curve 22, in Figure 6. The other channel in this system is comprised of bridges 18 and 19 coupled together by vacuum tube amplifiers 21. This channel has a single phase-shift curve as is given by curve 23 in Figure 6.

Figure 6:
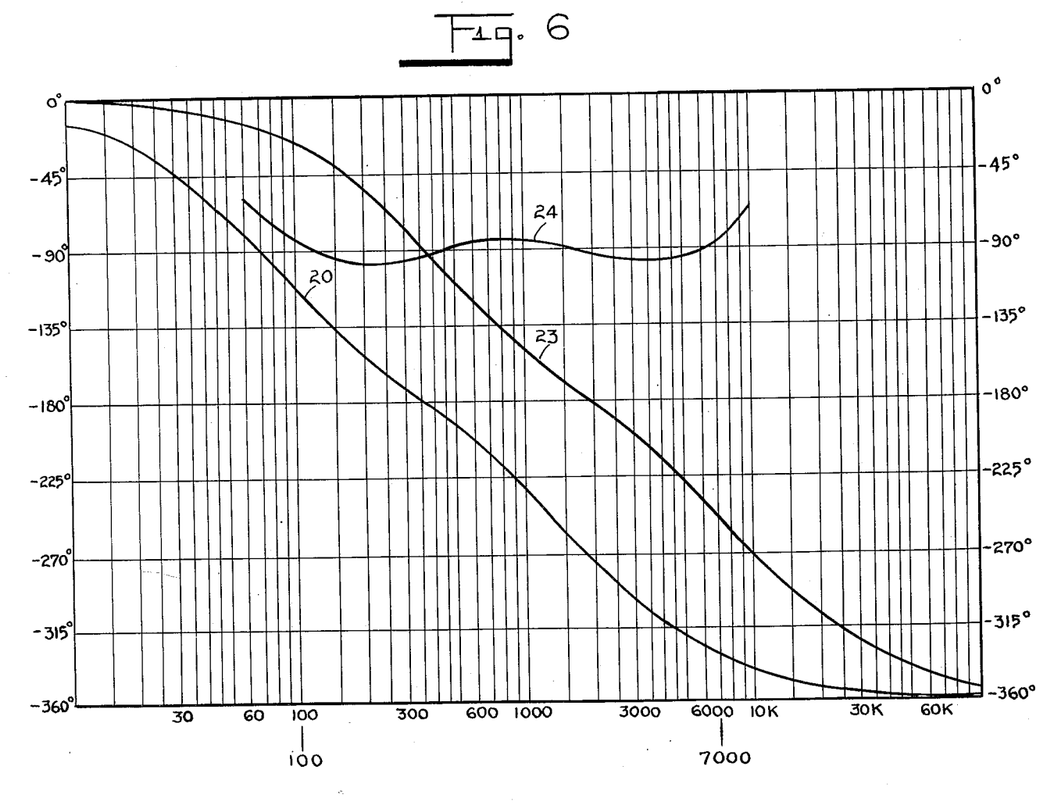
Figure 6 shows the phase-shift curve for the circuit of Figure 5.

In order to more clearly demonstrate the phase difference between the outputs of these two channels, this phase difference is plotted in Figure 6 as curve 24. It is to be observed that phase separation between the two circuits changes at the lower and upper ranges of frequency. However, over a substantial range of frequencies between about 100 cycles per second and about 7000 cycles per second the angular difference between the curves stays within 7° of the phase separation for which this system was designed. This is a much better constancy of phase than has been obtained previously with such simple apparatus.

Several items of interest and importance remain to be analyzed in connection with Figure 5. The input signal to bridge 16 is obtained from pick-up coil 25 which receives a signal from a transversely recorded magnetic signal on wire 26. Likewise, the input signal to bridge 18 is obtained from pick-up coil 27 oriented perpendicularly with respect to pick-up 25 which reproduces another component of the signal recorded on wire 26. One end of each of these two pick-up coils is shunted to ground by capacitor 28, and likewise is supplied with a positive bias potential for the operation of the amplifiers 20 and 21. This positive potential is necessary in the particular amplifier circuit shown, which is a particular type of differential amplifier. In other circuits, negative or no bias might be required.

Representative values of resistors and capacitors are marked on bridges 16 and 18. These are the values which have been chosen to give the result of Figure 6 and they constitute a specific example of the invention. These values have been chosen so that the point of inflection on the phase curve for bridge 16 occurs at 1500 cycles per second and the point of inflection of the phase curve for bridge 18 occurs at 8000 cycles per second.

Likewise, these values have been chosen so that over the entire frequency band the impedance looking into the bridge networks 16 and 18 from the two coils 25 and 27 shall be high compared to the impedance of the coils. This means that the voltage generated in the coil by the variable magnetic flux from moving wire 26 is supplied directly to the input of the bridges without the interposition of any substantial series impedance.

The output from bridge 16 is applied to the amplifier tubes 20. These tubes operate as a differential amplifier in accordance with well known principles. Since this amplifier circuit does not amplify the average voltage to ground of the input terminals but only amplifies the voltage difference between the two input terminals at the control grids of these two tubes 20, it does not matter that the input signal through these amplifier tubes is decidedly unbalanced with respect to ground. Similarly, amplifier tubes 21 operate in conjunction with bridge circuit 18 as a differential amplifier.

The output of tubes 20 is fed into the bridge circuit 17 and similarly the output of tubes 21 is fed into the bridge circuit 19. These bridge circuits operate in somewhat the same way as bridge circuits 16 and 18, but there are two substantial differences.

First of all, the critical frequencies, or frequencies of inflection in the phase curve of bridge circuits 17 and 19, are chosen at 75 cycles per second and 400 cycles per second respectively. Thus the two bridge circuits 16 and 17 are cascaded, and the two bridge circuits 18 and 19 are cascaded so as to give the phase curve of Figure 6.

Bridge circuits 17 and 19 supply low impedance loads. This means that these bridge circuits are substantially short-circuited. Furthermore, these circuits are fed from vacuum tubes which have a very high internal impedance. Thus the bridge circuits are effectively fed by current sources.

It can be shown by electrical theory that the characteristic of such a bridge circuit when fed by a current source and loaded with a very low impedance is substantially the same as the characteristic of this same bridge circuit when fed by a voltage source and working into an open circuit. Thus the phase formula of Equation 7 and the phase curve of Figure 3 are still applicable to this bridge.

One of the output terminals of each of the bridges 17 and 19 is grounded. In the case of bridge 17, this ground is through capacitor 28, and in the case of bridge 19 through capacitor 29. This makes use of the fact that the bridge impedance is low compared to the tube output impedance.

The output signal from bridge 17 is applied to one terminal of another differential amplifier including tubes 30; and the output of bridge circuit 19 is applied to the other grid input terminal of the amplifier formed by tube 30. The differential amplifier formed by tube 30 subtracts the two signals from these two circuits.

As applied to simple transverse recording, the following is the action of this circuit as shown in Figure 5:

The voltage picked up by coil 25 is substantially 90° out of mechanical phase but otherwise in time phase with the voltage picked up by coil 27, for every one of the frequency components constituting the intelligence recorded upon wire 26.

If the recording on the wire 26 is so oriented that it is perpendicular to the effective axis of coil 25, none of the signal is picked up by that coil, but coil 27 is fully effective. If the recording is rotated 90°, it is ineffective to generate signals in coil 27, while coil 25 is fully effective. The problem which is solved by this invention arises from the fact that when the wire is rotated to intermediate positions, the simple vectorial addition of the two signals would produce distortion. In fact, the amount of signal picked up by one coil is proportional to the cosine of the angle which the signal record makes with the coil axis, while the amount of signal picked up by the other coil is proportional to the sine of the same angle; that is, the angle between the recording and the axis of the first coil.

Thus, if the recording were oriented at 45° with respect to both coils, the amplitude of the vectorial sum of the two signals, which are, remember, in phase, would be 141% of its value when the wire is oriented in the plane of either one of the coils.

The present invention solves the problem thus presented by passing the outputs of the two coils 25 and 27 through a network to produce two output signals, the one originating at one pickup differing in phase by 90° with respect to the other. The two signals are then added vectorially, and the result is a true reproduction of the amplitude of the signal recorded on the wire 26. This result occurs in practice, and may be proved mathematically, but a simple example will make it immediately evident. If all the signal is picked up by one coil, whether or not it is delayed 90°, the amplitude will be correct. If the orientation of the recording is 45° with respect to both coils, so that the relative amplitudes of the two signals picked up are the same but too large for direct in-phase vectorial addition, if the signal in one channel be converted from a sine function of time to the corresponding cosine function, it may be added vectorially to the original sine function of time in the other channel to produce an output of correct amplitude.

Graphically, this constant amplitude is the radius of the circle around which the moving vector travels as time proceeds. Because a 90° time delay of the whole signal does not produce an audible effect, it simplifies the system to use the output in this form, but of course the whole signal supplied by my system may be restored to its original form by passing it through further phase delay networks of any convenient type, if required.

In the system shown in Figure 5, each of these frequency components picked up by coil 25 is fed through the upper channel as shown, and is applied to grid 31 of differential amplifier 30. Similarly the components picked up by coil 27 are fed through to grid 32 of differential amplifier 30.

However, the phase shift from coil 25 to grid 31 is 90° different than the phase shift from coil 27 to grid 32; and this 90° phase difference in transmission path is held substantially constant over the audio spectrum. Consequently, even though for every frequency picked up by coils 25 and 27, the voltages picked up are 90° out of phase with respect to each other, the voltages delivered to grids 31 and 32 are added vectorially in the differential amplifier 30. It is this latter condition which is desired, because then the voltage appearing between grids 31 and 32 is the vectorial summation of the voltages appearing over the two channels.

Accordingly the signal fed to the output of the system is proportional to the signal recorded on wire 26.

Figure 7:
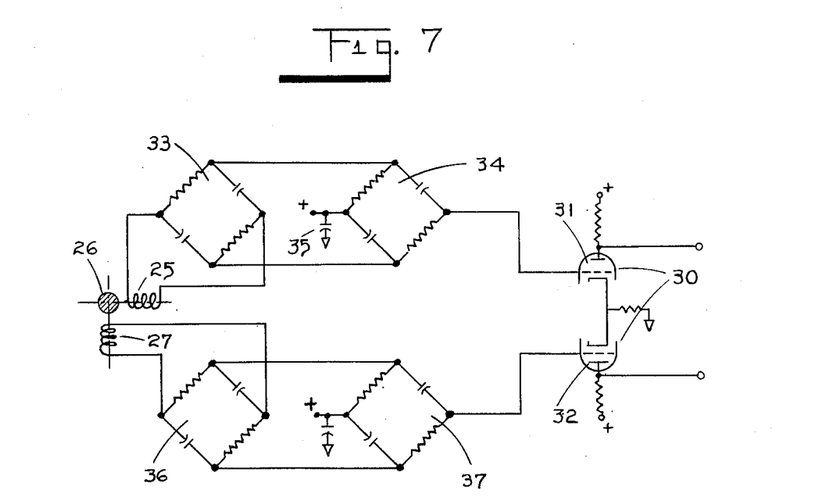
Figure 7 is another form of two-channel, two-lattice structure.

Figure 7 shows another device illustrating my method of accomplishing this purpose. The same pick-up coils 25 and 27 are used to pick up signals from the wire 26, and the same output differential amplifier built around tubes 30 is used. The bridge networks, however, are slightly different. In the upper channel which feeds from coil 25 to grid 31, two bridges 33 and 34 are used. Bridge 33 is arranged to have the same critical frequency as bridge 16; and bridge 34 is arranged to have the same critical frequency as bridge 17.

However, the impedance level, that is, the impedance of all of the elements at any particular frequency is one-tenth as great in bridge 33 as it is in bridge 16. Nevertheless, the impedance looking into bridge 33 is still sufficiently high compared to the impedance of coil 25, so that bridge circuit 33 is substantially fed by a voltage source. Furthermore, the impedance elements in bridge 34 have been chosen to be higher in impedance than those of bridge 17, so that the impedance looking from bridge 33 into bridge 34 is quite high compared to the impedance looking from bridge 34 to bridge 33. Thus bridge 33 acts substantially as if supplying an open circuit; and bridge 34 is substantially fed by a constant voltage source.

The output of bridge 34 is applied to the grid 31 and consequently is substantially working into an open circuit. One terminal of the output of bridge 34 is grounded by capacitor 35. This means that all of the system, including coil 25, bridge 33 and bridge 34, is unbalanced with respect to ground. This should cause no difficulty in the audio frequency range with the sizes of components used in this example, provided customary engineering skill is employed in the physical construction of this unit.

Similarly, the channel leading from pick-up coil 26 to grid 32 is constructed of two bridges 36 and 37. These have the same critical frequencies as bridges 18 and 19, but have other modifications in the same way that bridges 33 and 34 are modified in comparison with bridges 16 and 17. Again the output of the lower channel is applied to grid 32 of the output differential amplifier 30, and the output from the system becomes the vectorial sum of the voltages picked up by coils 25 and 27 from wire 26.

The circuit of Figure 7 is operative only if the impedances to ground from pickup coils 25 and 27 are high compared to the impedances of bridges 34 and 37. However, if this is not possible, for example, if one side of these coils must be grounded, the circuit of Figure 8 can be used. Here the bridges in the upper channel are the same as the bridges in upper channel in Figure 7, namely, bridges 33 and 34. Similarly, the bridges in lower channel are the same as the bridges in Figure 7, namely, 36 and 37. However, the outputs of bridges 34 and 37 are treated differently than they are in Figure 7.

Figure 8:
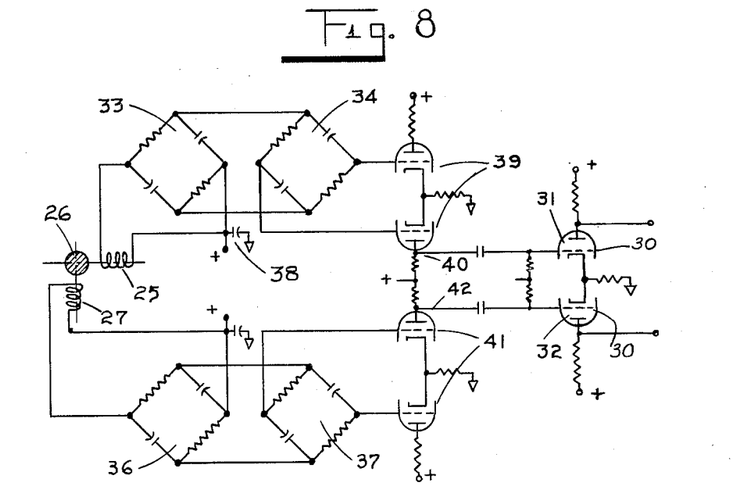
Figure 8 shows still another form of a two-channel, two-lattice structure.

In Figure 8 the output of bridge 34 is unbalanced with respect to ground and has neither side grounded since one corner of bridge 33 is grounded through capacitor 38. Consequently for this purpose I use a differential amplifier composed of tubes 39.

This amplifier has the characteristics that only the difference in voltage between the two grids applied to it appears across the output and between either output terminal and ground as an amplified signal. The amplifier discriminates against the average potential to ground.

The plate terminal 40 of one of the tubes is used as the output terminal for this differential amplifier, and the output is fed from this into grid 31 of the final differential amplifier 30. A similar arrangement is used in the lower channel, feeding from coil 27 through bridges 36 and 37 to differential amplifier 41, the output from the plate 42 of this differential amplifier feeding into the grid 32. This circuit then enables one side of each of the pick-up coils to be grounded and still allows the use of the bridge system of phase adjustment.

In place of the final differential amplifier tube 30, voltage adding or resistance mixing, such as is commonly employed in audio program mixers, may be used. That is, the output signals from tubes 39 and 41 may be added or subtracted to achieve the desired result, inasmuch as they are 90° out of phase throughout the useful range of frequencies.

The differential amplifier is illustrated in all these circuits because it is a particularly convenient way to achieve the result, as it provides high input impedance, gain, and mixing all in one unit.

Figure 9:
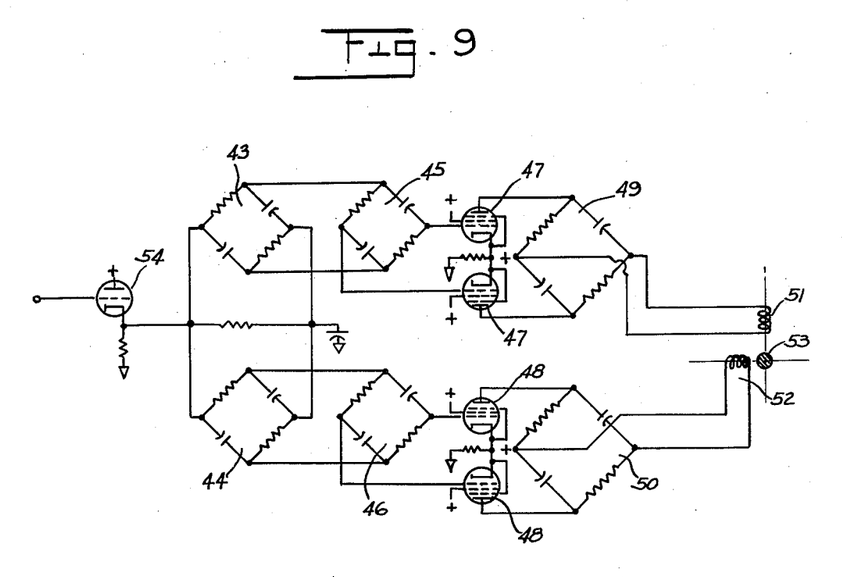
Figure 9 shows a two-channel, three-lattice structure, as applied to helical recording.

Under certain circumstances, the phase-shift curve obtained by Figure 6 will not cover a sufficient frequency range. Then it becomes desirable to use three bridges in tandem for each channel. An arrangement of this character is shown in Figure 9, as applied to the recording process for helical recording. Here in the upper channel, two bridges 43 and 45 are placed in tandem, just as bridges 33 and 34 are placed in tandem in Figure 8. Bridge 43 is a low impedance bridge and bridge 45 is a high impedance bridge in accordance with the principles set forth in connection with bridges 33 and 34 in Figure 8.

The output of bridge 45 is fed into a differential amplifier 47 but this differential amplifier is now loaded on both plates with bridge 49. This bridge 49 is fed from a high impedance circuit and feeds into a low impedance circuit following the principles set down for a bridge of the type of bridge 17 in connection with Figure 5. Thus, the bridge 49 feeds into the recording coil 51 which records on the wire 53.

The impedance of coil 51 should at all frequencies in the audio spectrum for this application be low compared to the impedance looking back into the output of bridge 49, in order to meet the requirements for this bridge, since it is fed from a current source—the differential amplifier 47.

The lower channel is composed of a similar chain of elements—two bridges 44 and 46, followed by a differential amplifier 48, followed by another bridge 50, and feeding into recording coil 52. In this circumstance, both channels are fed from a common source which, in order to provide a low impedance source, is a cathode follower circuit 54 which is itself driven by the audio signal to be recorded.

The purpose of the device of Figure 9 is to produce a helical recording which may be reproduced by an ordinary single transverse magnetic pickup regardless of the orientation or rotary motion of the wire recording. The term "helical" has been chosen as a reminder of the nature of the signal recorded on the wire. As will be understood upon consideration of the description of helical reproduction, a single sine wave tone of constant amplitude and frequency will be recorded by this process as a constant amplitude transverse magnetization of the wire, its orientation rotating at such a rate that the number of complete rotations per second passing the pickup coil is the same as the number of cycles per second of the tone. Variations of amplitude of the tone are recorded as variations in intensity of the magnetization, while variations in frequency cause a change in pitch of the helix. When complex notes are recorded, the above described effects are superimposed.

Figure 10:
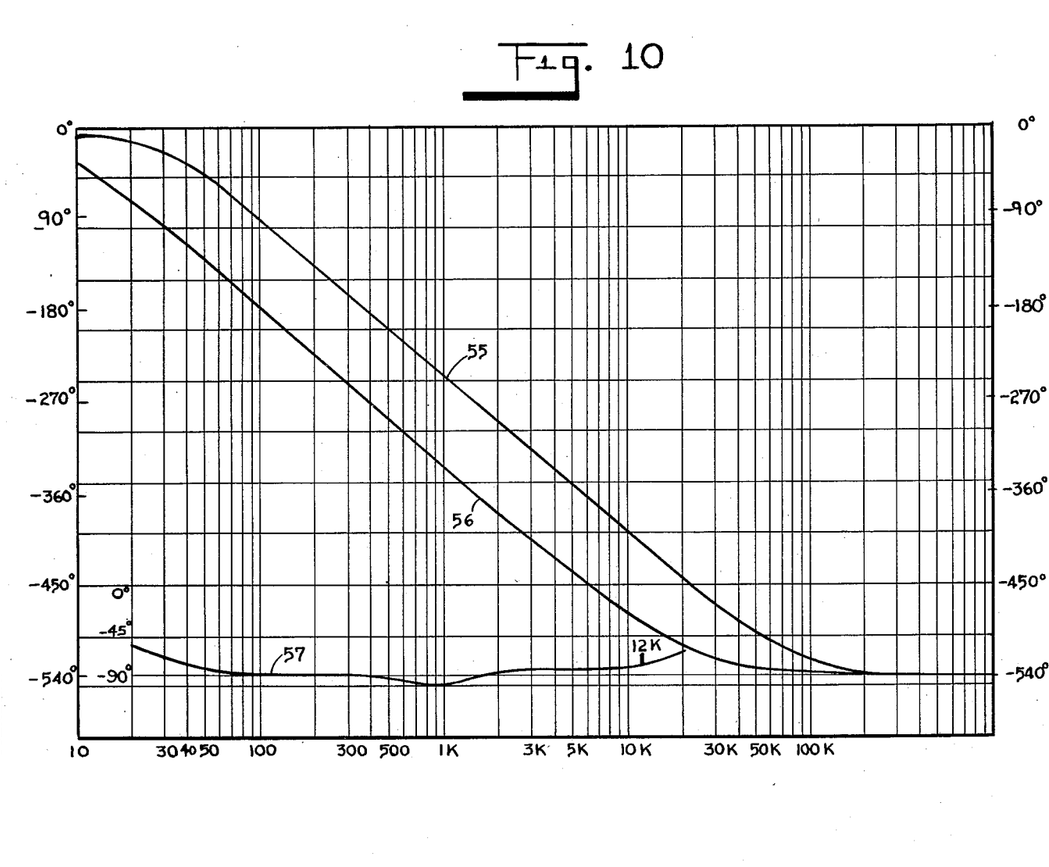
Figure 10 shows the phase-shift curve for Figure 9.

Figure 10 is the curve for the system of Figure 9. The upper channel has a phase shift in accordance with curve 55 in Figure 10. The lower channel has a phase shift in accordance with curve 56 in Figure 10. Consequently, the phase-angle difference between these two curves is given by curve 57. Inspection of this curve indicates that from a frequency of about 45 cycles per second to 12,000 cycles per second, the phase angle does not vary more than 10° from the normal value of 90°, and that for most of the range the phase angle is considerably closer to 90° than this tolerance of 10°.

Such a tolerance is sufficiently good for helical recording; but for other purposes it may be desirable to obtain better frequency-phase characteristics. These may be obtained by slight changes in the selection of the critical frequencies, or by an extension of the number of bridge circuits which are used.

The combination of a pair of bridges feeding one into another, such as bridges 33 and 34 in Figure 8 or Figure 7, can be extended considerably with the aid of cathode followers. Thus, in Figure 11 two bridges 58 and 59, being a low and a high impedance bridge respectively, feed into a pair of cathode followers 60 and 61. These cathode followers are simply impedance changing devices, that is, they change the impedance from a high impedance looking back into the output terminals of bridge 59 into a low impedance looking into the output terminals of the two cathode followers. Thus bridge 62 starts the chain over again as far as impedance is concerned; that is, bridge 62 is fed by a low impedance source. This in turn feeds bridge 63, which in turn, in this circuit, feeds the differential amplifier output system 64, which is used in order to correct the unbalance to ground.

Figure 11:
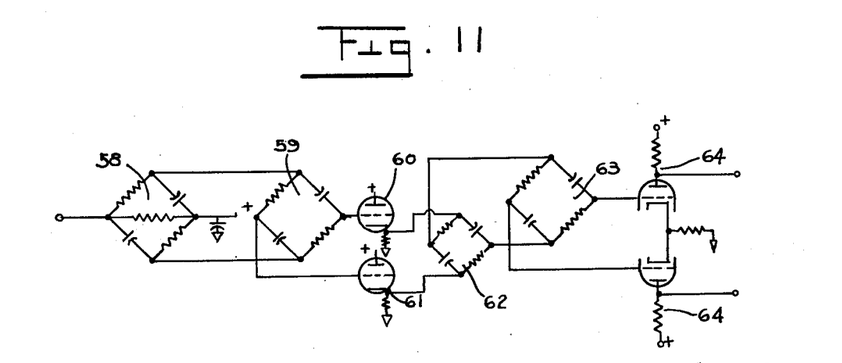
Figure 11 shows a four-lattice, single-channel structure using cathode followers for couplings.

This circuit arrangement could continue on for a considerable number of bridge combinations. However, in practice probably four tandem bridges will be the most that will be required for the strictest requirements.

In the design of tandem bridges for use in this type of network, the fundamental problem is the proper choice of critical frequencies for bridges to be placed in tandem.

When two bridge networks are used in each side of a double-channel system as in Figure 5, for example, I have determined graphically that the ratio of the frequency of bridge 16 to the frequency of bridge 17 should be about 1 to 5; that is, the critical frequency of bridge 16 should be one (1), compared to the critical frequency of bridge 18, which is 5. Similarly, the ratio of the critical frequency of bridge 16 to that of bridge 17 should be about 13 to 1 for a very smooth characteristic, and about 15 to 1 for a slightly less smooth phase characteristic but a slightly broader band.

It is apparent that many variations in the ratios of these frequencies could be used to obtain slight differences in the phase characteristics. The specific choice of critical frequencies will, of course, be determined by the specific usage to which the network is to be put, and the specific tolerances imposed by such usage.

I have described my invention of a phase-shifting system with respect to a specific set of applications, namely, that used in helical recording and reproducing. However, my invention should not be limited to this application, nor should it be limited to the particular embodiments which I have shown in these drawings. I should like my invention to be described by the following claims.

I claim:

1. A dual network comprising two separate signal channels, each of said channels having a pair of input terminals for impressing signals thereon and a pair of output terminals, a pair of terminals of one of said channels being connected to the corresponding pair of terminals of the other channel, said networks being in lattice form and consisting of distinct branches, some of said branches consisting solely of pure resistors and others of said branches consisting solely of substantially pure reactors to provide phase shifts differing from each other by ninety degrees over a predetermined frequency range without substantial attenuation, each channel comprising a series of lattices in cascade, the general relation between the phase of the signal in each lattice and the logarithm of frequency of the signal being substantially linear over a wide frequency band in each lattice, the values of the resistors and reactors being selected to provide inflection points of the relation between the phase and the logarithm of frequency which are different in the different channels, and amplifying tubes which couple said lattices in each cascade chain.

2. A dual network comprising two separate signal channels, each of said channels having a pair of input terminals for impressing signals thereon and a pair of output terminals, a pair of terminals of one of said channels being connected to the corresponding pair of terminals of the other channel, said networks being in lattice form and consisting of distinct branches, some of said branches consisting solely of pure resistors and others of said branches consisting solely of substantially pure reactors to provide phase shifts differing from each other by ninety degrees over a predetermined frequency range without substantial attenuation, each channel comprising a series of lattices in cascade, the general relation between the phase of the signal in each lattice and the logarithm of frequency of the signal being substantially linear over a wide frequency band in each lattice, the values of the resistors and reactors being selected to provide inflection points of the relation between the phase and the logarithm of frequency which are different in the different channels, the substantially pure reactors in said others of said branches being substantially pure capacitors, and amplifying tubes which couple said lattices in each cascade chain.

3. In an electrical circuit for generating a plurality of signals having a fixed phase angle difference from each other over a predetermined range of frequencies comprising two channels, each having an input circuit for impressing signals in said predetermined frequency range on said channels and each having output terminals, a pair of terminals of one of said channels being connected to the corresponding pair of terminals of the other channel, each of said channels comprising an all-pass network, each of said channels comprising a plurality of networks connected in tandem, each network consisting solely of resistors and reactors and each of the networks in a channel shifting the phase angles of the input signals by predetermined amounts, the inflection points of the relation between the phase and logarithm of frequency in each network in a channel being different for effecting frequency shifts over a relatively wide frequency range, the values of the reactors of the networks of the second of said channels differing from the values of the reactors of the first channel to shift the phases of the signals by amounts which differ from the shifts effected by said first channel by a substantially fixed amount over said predetermined frequency range, and a coupling amplifier connecting each of the networks in a channel to the adjacent network.

4. In an electrical circuit for generating a plurality of signals having a fixed phase angle difference from each other over a predetermined range of frequencies comprising two channels, each having an input circuit for impressing signals in said predetermined frequency range on said channels and each having output terminals, a pair of terminals of one of said channels being connected to the corresponding pair of terminals of the other channel, each of said channels comprising an all-pass network, each of said channels comprising a plurality of networks connected in tandem, each network consisting solely of resistors and reactors and each of the networks in a channel shifting the phase angles of the input signals by predetermined amounts, the inflection points of the relation between the phase and logarithm of frequency in each network in a channel being different for effecting frequency shifts over a relatively wide frequency range, the values of the reactors of the networks of the second of said channels differing from the values of the reactors of the first channel to shift the phases of the signals by amounts which differ from the shifts effected by said first channel by a substantially fixed amount over said predetermined frequency range, said reactors being capacitors, and the general relation between the phase of the signals and the logarithm of the frequency being substantially linear over a wide frequency band, and a coupling amplifier connecting each of the networks in a channel to the adjacent network.

5. In an electrical circuit for generating a plurality of signals having a fixed phase angle difference from each other over a predetermined range of frequencies comprising two channels, each having an input circuit for impressing signals in said predetermined frequency range on said channels and each having output terminals, a pair of terminals of one of said channels being connected to the corresponding pair of terminals of the other channel, each of said channels comprising an all-pass network, each of said channels comprising a plurality of networks connected in tandem, each network consisting solely of resistors and reactors and each of the networks in a channel shifting the phase angles of the input signals by predetermined amounts, the inflection points of the relation between the phase and logarithm of frequency in each network in a channel being different for effecting frequency shifts over a relatively wide frequency range, the values of the reactors of the networks of the second of said channels differing from the values of the reactors of the first channel to shift the phases of the signals by amounts which differ from the shifts effected by said first channel by a substantially fixed amount over said predetermined frequency range, said reactors being inductors, and a coupling amplifier connecting each of the networks in a channel to the adjacent network.

6. In an electrical circuit for generating a plurality of signals having a fixed phase angle difference from each other over a predetermined range of frequencies comprising two channels, each having an input circuit for impressing signals in said predetermined frequency range on said channels and each having output terminals, a pair of terminals of one of said channels being connected to the corresponding pair of terminals of the other channel, each of said channels comprising an all-pass network, each of said channels comprising a plurality of networks connected in tandem, each network consisting solely of resistors and reactors and each of the networks in a channel shifting the phase angles of the input signals by predetermined amounts, the inflection points of the relation between the phase and logarithm of frequency in each network in a channel being different for effecting frequency shifts over a relatively wide frequency range, the values of the reactors of the networks of the second of said channels differing from the values of the reactors of the first channel to shift the phases of the signals by amounts which differ from the shifts effected by said first channel by a substantially fixed amount over said predetermined frequency range, the phases of the signals being shifted by amounts which differ by substantially ninety degrees, and a coupling amplifier connecting each of the networks in a channel to the adjacent network.

7. In a signalling system for effecting shifts in phase angles of signals over a predetermined frequency range comprising a plurality of lattices connected in series and having an input circuit for receiving signals of a predetermined frequency range, each of said lattices in said series circuit being composed solely of resistors and reactors, and each having a linear relation of the phase shifts of the signals to the logarithm of the frequency, the inflection points of the relation between the phase and logarithm of frequency being different from that of the other lattices in said series circuit for producing a phase shift over a relatively wide frequency range, said lattices having a substantially zero attenuation for the signals over said predetermined frequency range, said reactors being inductors, and an electron tube coupling adjacent lattices.

HOWARD E. TOMPKINS.

REFERENCES CITED

The following references are of record in the file of this patent:

UNITED STATES PATENTS

| Number | Name | Date |
| --- | --- | --- |
| 2,174,166 | Plebanski | Sept. 26, 1939 |
| 2,229,450 | Garman | Jan. 21, 1941 |
| 2,392,476 | Hodgson | Jan. 8, 1946 |

FOREIGN PATENTS

| Number | Country | Date |
| --- | --- | --- |
| 439,977 | Great Britain | Dec. 18, 1935 |